United States Patent [19]

Uram, Jr.

[11] 4,382,832

[45] * May 10, 1983

[54] PROCESS FOR PREPARING LOW HAZE, HIGH TEMPERATURE-RESISTANT LAMINATES

[75] Inventor: John Uram, Jr., Glendale, Ariz.

[73] Assignee: Goodyear Aerospace Corporation, Akron, Ohio

[*] Notice: The portion of the term of this patent subsequent to Oct. 13, 1998, has been disclaimed.

[21] Appl. No.: 306,261

[22] Filed: Sep. 28, 1981

Related U.S. Application Data

[63] Continuation-in-part of Ser. No. 232,054, Feb. 5, 1981, Pat. No. 4,343,928, which is a continuation-in-part of Ser. No. 204,424, Nov. 6, 1980, Pat. No. 4,352,848, each is a continuation-in-part of Ser. No. 070,390, Aug. 28, 1979, Pat. No. 4,294,886.

[51] Int. Cl.³ .................. B32B 17/06; C08G 59/40
[52] U.S. Cl. .................. 156/99; 156/307.3; 156/313; 428/412; 428/413; 428/414; 52/789
[58] Field of Search .................. 156/99, 307.3, 313; 428/412, 413, 414; 528/89, 106, 108, 110, 394; 52/789

[56] References Cited

U.S. PATENT DOCUMENTS

| | | | |
|---|---|---|---|
| 2,953,545 | 9/1960 | Finestone | 528/91 |
| 3,247,280 | 4/1966 | Kanner | 528/27 |
| 3,269,853 | 8/1966 | English | 528/91 |
| 3,300,369 | 1/1967 | Burkley et al. | 428/414 |
| 3,616,839 | 11/1971 | Burrin et al. | 156/99 |
| 3,637,591 | 1/1972 | Coran | 528/89 |
| 3,928,708 | 12/1975 | Fohlen et al. | 428/413 |
| 4,081,581 | 3/1978 | Littell, Jr. | 52/789 |
| 4,230,769 | 10/1980 | Goossens | 428/414 |
| 4,294,886 | 10/1981 | Uram, Jr. | 428/412 |
| 4,343,928 | 8/1982 | Uram, Jr. | 428/412 |
| 4,352,848 | 10/1982 | Uram, Jr. | 428/192 |

FOREIGN PATENT DOCUMENTS 47-43200  10/1972  Japan .................. 528/27

Primary Examiner—Edward C. Kimlin
Assistant Examiner—F. K. Wine
Attorney, Agent, or Firm—P. E. Milliken; D. J. Hudak; L. A. Germain

[57] ABSTRACT

A process for providing a low haze, high transparent, high heat-resistant laminate by forming a preform laminate of a high heat-resistant layer covered on both surfaces by a non-glass protective layer with at least one said layer being an as-cast acrylic layer. This combination can be readily stored for long periods of time or used immediately after the formation thereof by peeling off one of the as-cast acrylic layers and applying a transparent flexible adhesive layer thereto. The transparent material can be added to the adhesive layer. Many other combinations and laminates can be formed from the preform high heat-resistant laminate since during the preparation thereof, haze is not introduced to the transparency via moisture, and contact with haze-forming release coatings is avoided.

32 Claims, 21 Drawing Figures

PROCESS FOR PREPARING LOW HAZE, HIGH TEMPERATURE-RESISTANT LAMINATES

CROSS-REFERENCE

This application is a continuation-in-part of U.S. Ser. No. 232,054 filed Feb. 5, 1981, now U.S. Pat. No. 4,343,928 which in turn is a continuation-in-part application of an application filed on Aug. 28, 1979, bearing Ser. No. 70,390, now U.S. Pat. No. 4,294,886. This application is also a continuation-in-part application of U.S. Ser. No. 232,054, filed Feb. 5, 1981, now U.S. Pat. No. 4,543,928, which in turn is a continuation-in-part application of an application filed on Nov. 6, 1980, bearing Ser. No. 204,424, now U.S. Pat. No. 4,352,848. Application Ser. No. 204,424 is a continuation-in-part of application Ser. No. 70,390, filed Aug. 28, 1979 now U.S. Pat. No. 4,294,886.

TECHNICAL FIELD

The present invention relates to a process for the preparation of high heat-resistant transparencies and laminates thereof having low haze. The process eliminates contact with haze-forming compounds as well as prevents moisture contact which will result in haze formation. Numerous high heat-resistant laminates can be produced by the present invention.

BACKGROUND ART

Heretofore, no known prior art existed.

My above-noted copending specifications relate to the forming of a laminate having a glass layer, a space between said glass layer and an as-cast acrylic layer, and a glass layer on the other side of said as-cast acrylic layer. A high heat-resistant material would then be cast into the space. In order to prevent adhesion between the high heat-resistant material and the glass, various release agents such as Repcon, a trademark of Unelko Corporation, Chicago, Ill., containing tetraethylorthosilicate, was applied to the glass. However, such release coatings would often adhere to the high heat-resistant layer and impart a haze thereto. Moreover, upon removal of the glass layer, and prior to subsequent application of a transparent material thereon, moisture would commence buildup which would also impart haze to the high heat-resistant layer. Although such layer could be heated in an oven prior to the application of a layer thereon, not all of the moisture was removed and thus some haze still remained. The laminate could be applied in combination with other transparent layers to form any number of combinations of various laminates, all having high heat resistance. However, the final product or laminate was not as haze-free as often desired.

DISCLOSURE OF INVENTION

It is therefore an object of the present invention to provide a process for forming high heat-resistant laminates having low haze values.

It is another object of the present invention to provide a process for making high heat-resistant, low haze laminates, as above, wherein a high heat-resistant material is located between a pair of as-cast acrylic layers or between one acrylic layer and a non-glass transparent material layer.

It is yet another object of the present invention to provide a process for making high heat-resistant, low haze laminates, as above, wherein said process eliminates the use of any release agents.

It is another object of the present invention to provide a process for making high heat-resistant, low haze laminates, as above, wherein said high heat-resistant layer sandwiched between said non-glass layers, at least one of which is an as-cast acrylic layer which can be stored for an indefinite period of time and is generally resistant to moisture.

It is yet another object of the present invention to provide a process for making high heat-resistant, low haze laminates, as above, wherein an as-cast acrylic layer is removed from said high heat-resistant layer with the subsequent item combined with at least another layer of material to form various laminates.

It is yet another object of the present invention to provide a process for making high heat-resistant, low haze laminates, as above, wherein said various steps can be carried out at various temperatures utilizing various specific materials.

These and other objects of the present invention will become more apparent from the detailed description of the preferred embodiment.

In general, a process for preparing a transparent, low haze, high heat-resistant laminate, comprises the steps of: forming a high heat-resistant layer, said high heat-resistant layer having a transparent protective layer on either side thereof, at least one of said protective layers being an as-cast acrylic layer.

Additionally, a process for preparing a transparent, low haze, heat-resistant laminate, comprises the steps of: locating two protective layers in juxtaposition to one another and having a space therebetween, at least one of said protective layers being an as-cast acrylic material; locating a glass layer on each acrylic layer; and adding a high heat-resistant material between said spaced protective layers.

BRIEF DESCRIPTION OF DRAWINGS

For an understanding of the invention, reference is had to the following drawings, wherein:

FIG. 17 is a cross-sectional view of an initial laminate of the present invention;

FIG. 18 is a cross-sectional view showing the laminate of FIG. 17 having the two outer layers removed;

FIG. 19 is a cross-sectional view showing the top layer of FIG. 18 being removed;

FIG. 20 is a cross-sectional view showing the remaining laminate of FIG. 18 incorporated into a final laminate; and FIG. 21 is a flow diagram briefly outlining some of the various processes of the present invention.

BEST MODE FOR CARRYING OUT THE INVENTION

Transparencies that have been produced with epoxy resins desiring to achieve heat-resistant properties have typically included a boroxine such as trimethoxyboroxine. Typical epoxy resins include, but are not limited to, bisphenol-A type, bisphenol-F type, and novalac type epoxy resins. Typical boroxines include boroxines having the formula

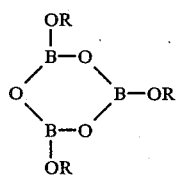

where R is a group having from 1 or 2 to 18 carbon atoms. Desirably, R is an alkyl group and has from 1 or 2 to 5 carbon atoms. Trimethoxyboroxine is preferred. Trimethoxyboroxine has exhibited, in combination with epoxy resin, a resistance to heat from a general or point source up to temperatures of 2,000° F. However, a major complication is the low concentration of trimethoxyboroxine in the epoxy resin system. Previously, for large casting purposes, it was possible to use a concentration of trimethoxyboroxine of 5–7.5 parts per hundred parts of epoxy resin (PHR). Any greater concentration would deleteriously promote the reaction between the trimethoxyboroxine and epoxy resin, resulting in a short gel time making it extremely impractical to cast large panels.

Figure 4:
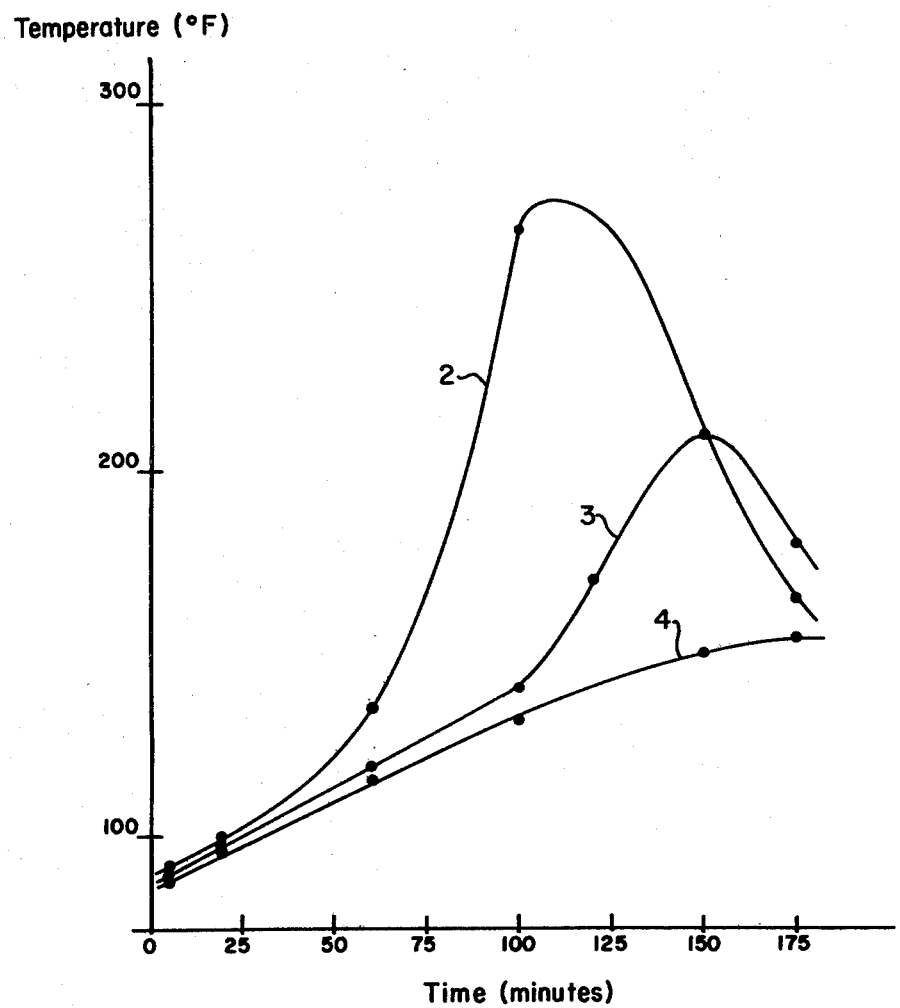
FIG. 4 is a graph showing the effect of alcohol levels on the maximum exotherm in the reaction system.

It has been found that higher concentrations of a boroxine such as trimethoxyboroxine can be incorporated into an epoxy resin system and still have sufficient time to cast large sheets if a phenyl substituted alkyl alcohol is added. The alkyl alcohol contains from 1 to 20 carbon atoms and desirably from 1 to 10 carbon atoms. Preferably, benzyl alcohol is used. The alcohol acts as retarder and inhibitor for the trimethoxyboroxine epoxy reaction, permitting the usage of an increased concentration of the trimethoxyboroxine and a concomitant increase in heat resistant properties. This concentration may be readily increased to 30 parts of a boroxine such as trimethoxyboroxine per hundred parts of epoxy resin. Not only is the rate of reaction between the trimethoxyboroxine and epoxy resins inhibited, but the maximum exotherm is significantly reduced with the phenyl substituted alkyl alcohol addition, as shown in FIG. 4.

TABLE 1

THE EFFECT OF BENZYL ALCOHOL ON MAXIMUM EXOTHERM

| | Curve | | |
|---|---|---|---|
| | 2 | 3 | 4 |
| Trimethoxyboroxine | 10 | 10 | 10 |
| Benzyl Alcohol | 2 | 3 | 4 |
| Dow DEN-431 | 85 | 85 | 85 |
| Neopentyl Glycol Diglycidyl Ether | 15 | 15 | 15 |
| Gel Time (Minutes) | 65 | 85 | No sharp gel time |
| Maximum Exotherm (°F.) | 270 | 215 | 115 |

While phenyl substituted alkyl alcohols permit increased concentration of the trimethoxyboroxine in the epoxy resin, benzyl alcohol is preferred. Benzyl alcohol is preferred because of its purity, as well as its index of refraction, its clear color, its high flash point, its relatively low solubility in water, its low viscosity, and its high boiling point.

Both the epoxy resins capable of serving as the matrix for the intense heat-resistant composite and the trimethoxyboroxine and their heat-resistant properties are known to those skilled in the art of composite transparency production. However, it is the inclusion of the phenyl substituted alkyl alcohol which enables one to increase the level of trimethoxyboroxine which results in an increase in intense heat resistance for the transparency not otherwise present. The phenyl substituted alkyl alcohol is present in a concentration of from about 20 parts to about 50 parts per one hundred parts of trimethoxyboroxine or from about 1 part to about 10 parts per 100 parts of epoxy resin. Preferably, the concentration of benzyl alcohol is 33 parts to one hundred parts of trimethoxyboroxine, or 3.3 parts to one hundred parts of epoxy resin.

Figure 1:
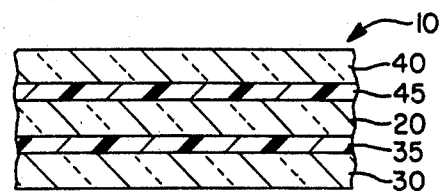
FIG. 1 is a cross-sectional view of the transparency composite having the intense heat-resistant layer.

Referring now to FIG. 1, it may be seen that the transparency composite, generally referred to as 10, is composed of three layers with the epoxy resin interply 20, a reaction product of an adduct of trimethoxyboroxine and benzyl alcohol with an epoxy resin placed between an inside ply 40 and an outside ply 30. The outside ply 30 may be composed of transparent materials well known to those skilled in the art and specifically providing impact, ballistic, abrasion, weather resistant and light reflectant resistant properties which resin interply 20 complements.

Typically, this outside ply 30 may be composed of acrylic, polycarbonate, polyurethane and any inside ply 40 may be chosen from those same transparent materials or others well known to those skilled in the art which are not necessary for impact, ballistic, abrasion, weather resistant or light reflection resistance.

Figure 3:
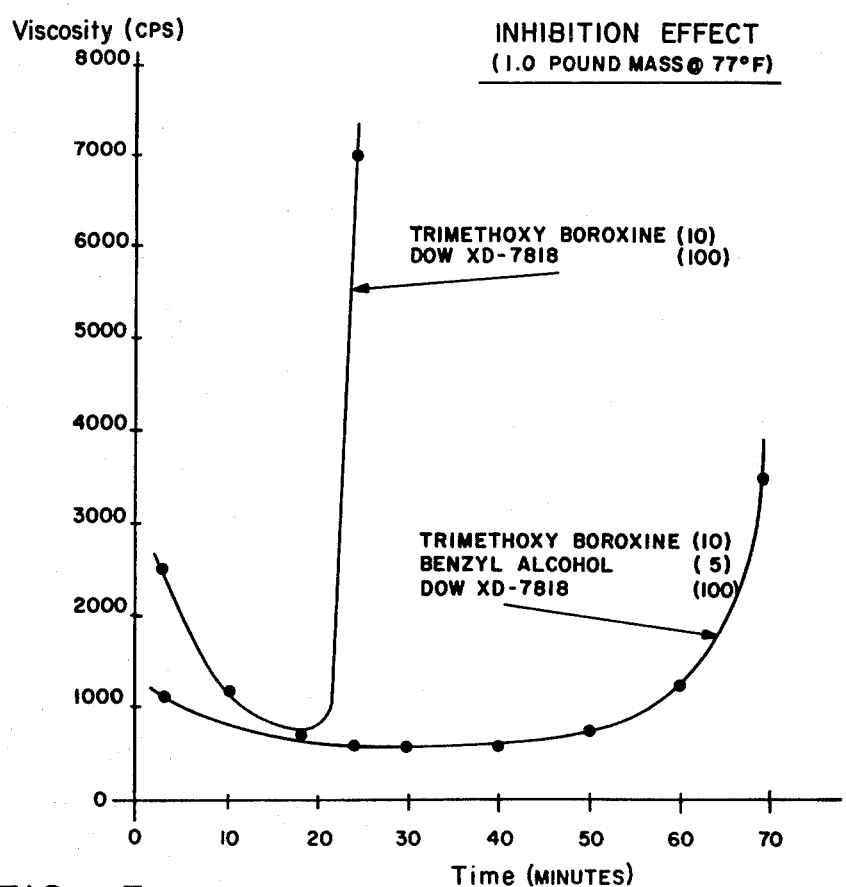
FIG. 3 is a graph of the production of the transparency having benzyl alcohol showing the increase in gel time.

All of the components of interply 20 are mixed and degassed, then cast against an acrylic ply through the use of a casting cell technique well known to individuals in the industry. Should it be necessary to cast interply 20 by itself, the same technique can be used, the only difference being interply 20 would be cast against a chemically treated glass plies, such that after cure the glass plies can be removed, resulting in an optically clear interply 20. This interply casting can then be bonded to other transparent layers with materials as discussed below. However, the use of the alcohol permits larger castings than previously possible. Gel times are increased by the addition of the alcohol to permit larger castings, as may be seen in FIG. 3.

When joining the various plies 20, 30 and 40 of the transparency composite 10, it may be necessary to use binding means to insure adequate contiguity between the various layers. For example, binding means 45 may exist between the intense heat-resistant resin interply 20 and inside ply 40, and this binding means 45 may be chosen from adhesives such as silicones, urethanes and epoxies. Also, binding means 35 may be necessary between intense heat-resistant resin interply 20 and outside ply 30, the composition of such binding means being typically silicones, urethanes, and epoxies.

However, it is preferred to utilize a mercaptan resin for binding means 35 and 45, as described below, to increase resistance to moisture permeability for transparency composite 10.

The intense heat-resistant resin interply 20 may optionally be composed of an epoxy resin cured with adducts of a boroxine such as trimethoxyboroxine, phenyl substituted alkyl alcohols, and organic phosphorous compounds selected from the following formula:

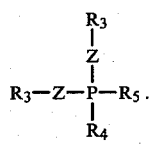

Where $R_3$ is selected from the group consisting of hydrocarbon radicals having from 1 to 24 carbon atoms, halo-substituted organic radicals having from 1 to 24 carbon atoms, and multihalo-substituted organic radicals having from 1 to 24 carbon atoms; and where $R_3$ may be the same or different radicals.

The $R_4$ is selected from the group consisting of all the radicals of $R_3$, oxygen, and radicals of the formula: —O—$R_6$, where $R_6$ is selected from the group consisting of all the radicals of $R_3$, organo-phosphorus polymeric radicals, and organo-phosphorus esters; where $R_5$ is selected from the group consisting of hydrogen, hydroxyl, oxygen, sulfur, halogens or no radical at all; and where Z is selected from the group consisting of oxygen, sulfur, or no radical at all. Examples of $R_3$ are phenyl, alkyl-substituted phenyl, chloro-substituted alkyl, and alkyl radicals. Examples of $R_4$ radicals are the examples of $R_3$ radicals, oxygen, phenoxy, alkyl-substituted phenoxy, alkoxy, alkyl-substituted alkoxy, chloro-substituted phenoxy, chloro-substituted alkoxy radicals and radicals having phosphorus units in polymeric or ester configuration.

Specific compounds include triphenyl phosphite, diphenyl phosphite, diphenyl isodecyl phosphite, tris nonylphenyl phosphite, tri(beta, beta' dichloroisopropyl) phosphate, tri(beta chloroethyl) phosphate, bis chloroethyl phosphate ester, and a phosphate polymer of the formula:

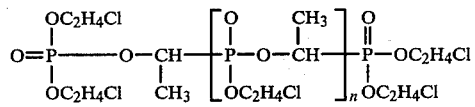

where n is a number from 1 to 20.

The desirable phosphite compounds are: diphenyl phosphite, trisnonylphenyl phosphite, triphenyl phosphite, diphenylisodecyl phosphite, diphenylisooctyl phosphite and phenyldiisodecyl phosphite. Preferably, diphenyl phosphite and triphenyl phosphite may be used. The addition of from 1 parts to 40 parts of an organic phosphorous compound such as per 100 parts of the epoxy resin dramatically increases the intense heat-resistant properties of the interply 20 at high temperatures, typically greater than 2000° F. Alternately, the concentration of the organic phosphorus compound may be from about 50 parts to 250 parts per 100 parts of the boroxine or from about 5 parts to about 40 parts per 100 parts of the epoxy resin. The addition of this amount of triphenyl phosphite provides sufficient phosphorus in the resin to increase the time of burn-through of a ¼ inch casting of interply 20 almost ten times as long as interply 20 without phosphorus is further beneficial by providing a greater than 20 percent increase in time of burning at the lower temperatures around 2000° F. Therefore, the inclusion of this phosphite significantly increases the intense heat-resistant properties already present in the interlayer 20 and complements the other resistant properties in outer layer 30 in the transparency composite 10.

Figures 15, 16:
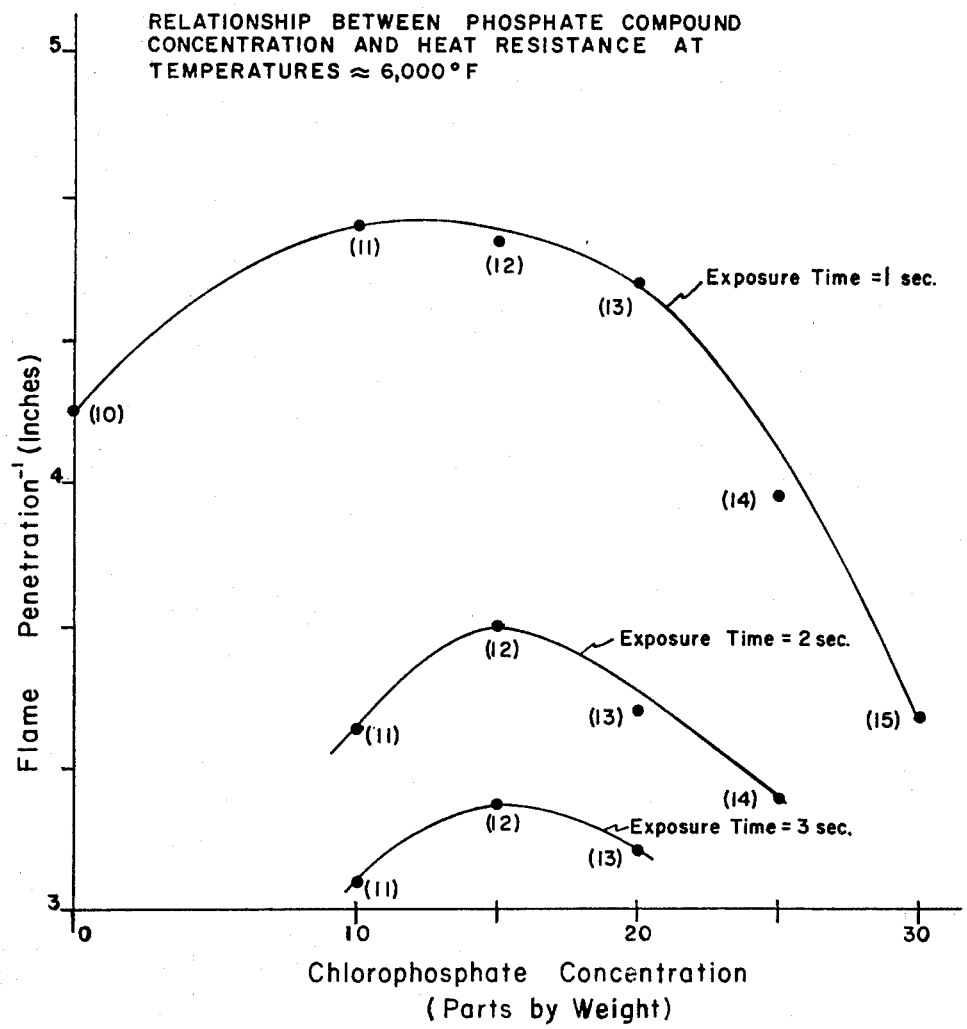
FIG. 15 is a cross-sectional view of the transparency composite having an intense heat-resistant interlayer having a chlorophosphate compound.
FIG. 16 is a graph showing the relationship between the concentration of the phosphate compound and the ability of the heat-resistant interlayer to resist flame penetration.

Of the phosphate compounds, the specific phosphate compounds already mentioned are desirable. Preferably, tri(beta, beta' dichloroisopropyl) phosphate and tri(beta chloroethyl) phosphate may be used. The former is commercially available under the trade name Fyrol FR-2 manufactured by Stauffer Chemical Company, whereas the latter compound is commercially available as Fyrol CEF, manufactured by Stauffer Chemical Company. The addition of from about 10 parts to about 400 parts of the phosphate compound per 100 parts of the boroxine compound or from about 1 part to about 40 parts per 100 parts of the epoxy resin dramatically increases the intense heat-resistant properties of the interply 20, as seen in FIG. 15, at high temperatures, typically greater than 2000° F.

Alternately, the concentration of the phosphate compound may be from about 50 parts to 250 parts per 100 parts of the boroxine or from about 5 parts to about 30 parts per 100 parts of the epoxy resin. The addition of this amount of the preferred chlorophosphate compounds described above provides sufficient phosphorus in the resin to increase the time of burn-through of a casting of interply 20, as seen in FIG. 16 and the following tables.

A comparison of the phosphate compound with the phosphite compound demonstrates the preference of the phosphate compounds. In the production of the phosphite compounds, trace amounts of water are impurities which generate the production of phenol during the curing of the interply 20. The generation of free phenol accelerates gel times which must be retarded as seen in FIG. 4 to permit larger castings. Substitution of the phosphate compound for its synergistic heat-resistant properties into interply 20 avoids the presence of water impurities in the phosphite compounds, which permits a control over the gel time of the larger castings. Further, the phosphate compound does not shorten gel times because the chemical interaction of the phosphate during curing does not produce byproducts which act as accelerators for the reaction. As the optimum phosphate compound concentration is obtained, it may be possible to eliminate the phenol substituted alkyl alcohol as an inhibitor of gel time, such as that seen in FIG. 3. The following Table 2 demonstrates the formulation of an interply 20 employing phosphate compounds. However, it may be possible to employ a combination of phosphite and phosphate compounds for improved burn-through efficiency.

for any heat-resistant interlayer 20 in any laminate described herein is possible and within the concept of this invention. Testing for formulations 1-9 for burn-through time at approximately 6000° F. was conducted with a laminate structure identified in FIG. 15 where plies 30 and 40 were acrylic.

An examination of formulations 10-15 in Table 2, in comparison with FIG. 16 demonstrates the ability of an interply 20 having a phosphate compound to resist the penetration of high heat sources. Formulations 10-15 demonstrate an increasing concentration of the phosphate compound from a control having no phosphate to an interply 20 having 30 parts by weight of phosphate compound. As seen in FIG. 16, three samples of each formulation was exposed to a heat source developing temperatures at about 6000° F. The reciprocal of penetration in inches demonstrates the resistance of each formulation to exposure time in seconds. Consequently, it is apparent that an optimal concentration of the phosphate ranges between about 10 parts by weight to about 20 parts by weight. Indeed, formulations 11-13 were capable of withstanding exposure times for a period of about three seconds which exceeds the burn-through time for any of the formulations 1-9. Therefore, it is optimal to have from about 10 to about 20 parts of the phosphate compound in interply 20. Again, testing of

TABLE 2

FORMULATIONS OF INTERPLY 20 USING PHOSPHITE AND PHOSPHATE COMPOUNDS, RESPECTIVELY/IMPROVEMENT IN HEAT RESISTANCE

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Boroxine Compound (triemethoxyboroxine) | 10 | 10 | 10 | 10 | 10 | 10 | 10 | 10 | 10 | 10 | 10 | 10 | 10 | 10 | 10 |
| Phenyl Substituted Alkyl Alcohol (benzyl alcohol) | 3 | 3 | 3 | 3 | 3 | 3 | 3 | 3 | 3 | — | — | — | — | — | — |
| Novalac-Type Epoxy Resin (DEN-431) | 90 | 90 | 90 | 45 | 45 | 45 | — | — | — | — | — | — | — | — | — |
| Bisphenol-F Type Epoxy Resin (EPICLON-830) | — | — | — | 45 | 45 | 45 | 90 | 90 | 90 | 90 | 90 | 90 | 90 | 90 | 90 |
| Phosphite Compound (triphenyl phosphite) | 10 | — | 5 | 10 | — | 5 | 10 | — | 5 | — | — | — | — | — | — |
| Phosphate Compound (Fyrol CEF) | — | 10 | 5 | — | 10 | 5 | — | 10 | 5 | — | 10 | 15 | 20 | 25 | 30 |
| Silane Compound (A-187) | 1 | 1 | 1 | 1 | 1 | 1 | 1 | 1 | 1 | — | — | — | — | — | — |
| Burn-through time at approximately 6000° F. (sec.) | 1.6 | 1.6 | 1.5 | 1.9 | 1.9 | 1.8 | 2.4 | 2.2 | 2.0 | 2.0 | 3.0 | 3.0 | 3.0 | 2.0 | 2.0 |
| Percentage change in heat resistance | control | 0% | −6% | +19% | +19% | +13% | +50% | +38% | +25% | control | +50% | +50% | +50% | 0% | 0% |

As may be seen by reference to Table 2, variations of the formulations 1-9 demonstrate the substitution of the phosphate compound in interply 20 compared with a phosphite compound in interply 20. When coupled with the reaction processing advantages of the phosphate compound, the substitution of the phosphate compound for the phosphite compound is desirable. Therefore, the use of interply 20 having phosphate compounds therein interply 20 occurred using a laminate seen in FIG. 15 where inside and outside plies 30 and 40 respectively, were both acrylic.

Referring again to Table 2, it is also apparent that the epoxy resin may desirably be a bisphenol-F type epoxy resin. Comparison of formulations 1-3 with formulations 7-9 demonstrate a percentage change in heat resistance when the novalac-type epoxy resin is substituted with the bisphenol-F type epoxy resin.

Figure 2:
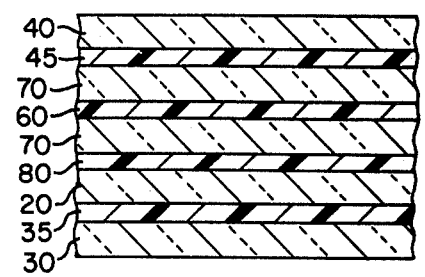
FIG. 2 is a cross-sectional view of the clad transparency composite having the intense heat-resistant interlayer.

Referring now to FIG. 2, the importance of intense heat-resistant epoxy resin interply 20 in a clad composite transparency may be understood. This transparency is shown cross-sectionally to demonstrate the effectiveness of a particular clad composite format. Clad outside ply 30 having binding means 35 is secured to intense heat-resistant resin interply 20 comprising an epoxy resin cured with adducts of trimethoxyboroxine and benzyl alcohol alone or together with triphenyl phosphite. Alternatively, interply 20 may be cured with a boroxine compound and a phosphate compound, alone or together with a phenyl-substituted alcohol. A silicon interlayer 80 functions as a flexible adhesive to the opposite surface of interply 20 to a silicate layer 70 typically composed of soda lime glass, borosilicate glass, aluminosilicate glass, silica glass or 96 percent silica glass. On the opposite side of silicate layer 70 is an interlayer 60 which consists of a silicone or polyurethane or polyvinyl butyral interlayer. On the opposite side of interlayer 60 is a second silicate layer 70. On the opposite side of the second silicate is binding means 45 which consists of a silicone or polyurethane interlayer. On the opposite side of the binding means 45 is the inside ply 40 of the composite, composed of the same materials as discussed above, including polycarbonate.

However, it is also possible to utilize a mercaptan resin for any or all of binding means 35 and 45 and interlayers 60 and 80. The importance of such mercaptan resin in moisture permeability resistance for composite 50 is described below.

It has been found that the combination of these layers 20, 30, 35, 40, 45, 60, 70, and 80 in the order described above provides a synergistic resistance greater than the application of layers 30 and 40 surrounding interlayer 20. Clad outer layer 30 may be selected from those transparent materials commonly known to those skilled in the art, as described above and typically be acrylic.

Figure 5:
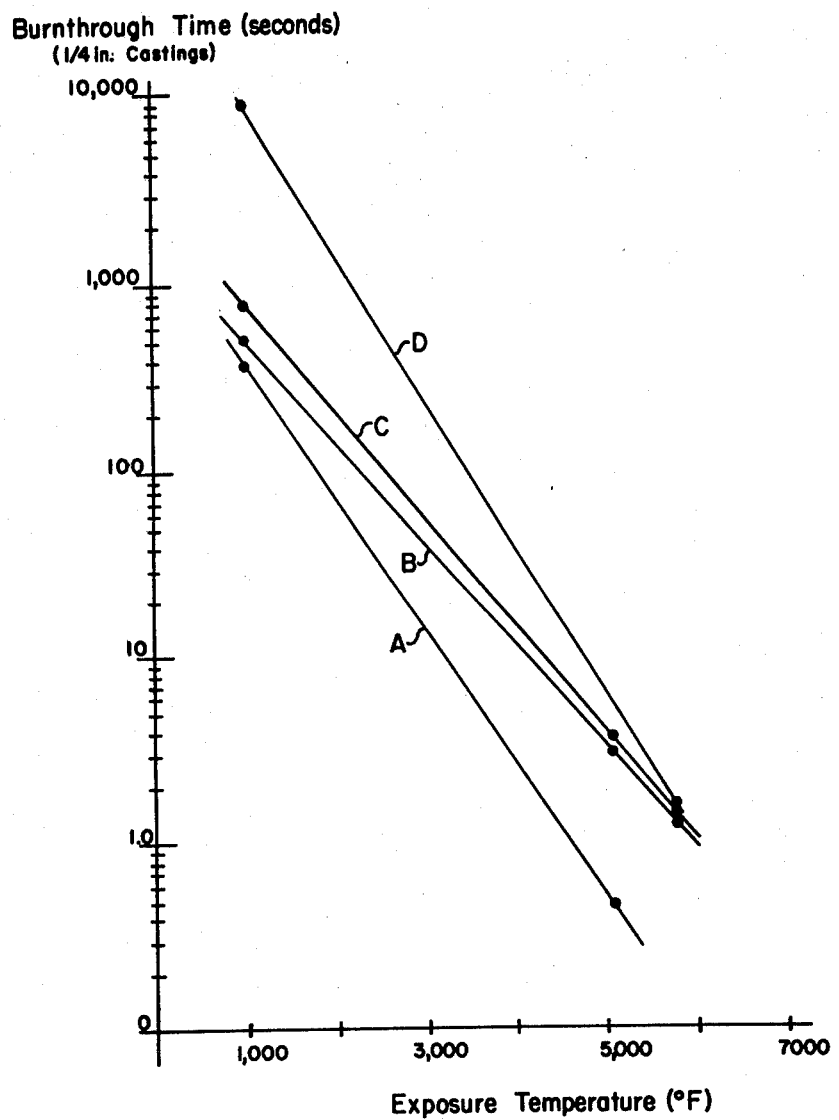
FIG. 5 is a graph showing the increased burn-through resistance on the transparencies having benzyl alcohol and triphenyl phosphite.

For an understanding of the improved heat-resistant properties of interply 20, reference is had to FIG. 5.

TABLE 3

HEAT RESISTANT TRANSPARENCIES - RELATIONSHIP BETWEEN BURNTHROUGH TIME AND EXPOSURE TEMPERATURE

| | Line | | | |
|---|---|---|---|---|
| | A | B | C | D |
| Trimethoxyboroxine | 7.5 | 10 | 10 | 7.5 |
| Benzyl Alcohol | — | 5 | 3 | 2.5 |
| Triphenyl Phosphite | — | 5 | 10 | — |
| DER-332 | 100 | — | — | — |
| DEN-431 | — | 85 | 90 | 90 |
| Heloxy-68 | — | 15 | — | — |
| Silane A-187 | — | 1 | 1 | 1 |
| Diphenyl Phosphite | — | — | — | 15 |
| Burnthrough at 2000° F. (secs.) | 378 | 522 | 790 | 9000 |
| Burnthrough at 6000° F. (secs.) | 0.4 | 3.0 | 3.7 | 5.8 |

It can be seen from FIG. 5 that by the addition of benzyl alcohol, a higher concentration of trimethoxyboroxine can be incorporated, resulting in improved, burnthrough resistance at 2000° F. and at 6000° F.

Transparencies 10 and 50 which contain interply 10 may be utilized in various military and industrial applications. Typically, these applications may include the use of transparencies in military hardware and aircraft, as well as spacecraft. Further, industrial applications include transparencies where protection against the thermal effects of fossil fuel fires, nuclear blasts and high energy radiation are required.

The lasting success of any transparency composite, designed to withstand high heat resistance, impact resistance, ballistic resistance, abrasion resistance remains dependent upon its continuing transparent nature. The plurality of layers of composites 10 and 50 and the chemical composition of each layer are differentially susceptible to the permeation of moisture into and through the layers. The retention of moisture between and within the various layers of this invention and any conventional transparency composite having multiple layers creates a haze which disrupts clarity of light transmissions through the transparency composite.

A barrier to the generation of haze is necessary for any multi-layer transparency composite. The layers 35 and 45 and interlayers 60 and 80 have been found to provide the most effective permeation barrier, resistant to moisture permeability into central layers, such as heat-resistant interlayer 20 and silicate layers 70 as seen in FIG. 1 and FIG. 2, or for heat resistant interlayers 20 having phosphate compounds therein.

The composition for the binding means 35 and 45 and interlayers 60 and 80 comprises about 100 parts by weight of a mercaptan terminated resin, from about 40 to about 250 parts by weight of an epoxy resin, and from about 0.5 to about 4.0 parts by weight of a silane catalyst.

The mercaptan terminated resin is an aliphatic hydrocarbon based compound having a thio reactive group terminating each end of the molecule. The mercaptan has the following general formula:

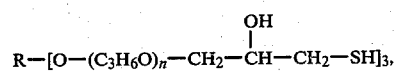

where R is an aliphatic hydrocarbon having from 1 to 18 carbon atoms and n is 1 or 2. The mercaptan resin is a material commercially available from Diamond Shamrock Corporation and sold identified as DION-3-800LC.

The epoxy resin of the binding means 35 or 45 or interlayer 60 or 80 is composed of epoxy resins previously disclosed with reference to interply 20. Typical epoxy resins include, but are not limited to, bisphenol-A type, bisphenol-F type, and novolac type epoxy resins. A preferred concentration of the epoxy resin depends on the type of epoxy resin used. For an epoxy-novolac type resin the preferred concentration is about 100 parts by weight. Epoxy resins commercially available include DER-332, a product of Dow Chemical Company.

The silane catalyst of the binding means 35 or 45 or interlayer 60 or 80 is composed of an amine terminated silane compound such as N-aminoalkyl-aminoalkyl-trialkoxysilanes of the formula

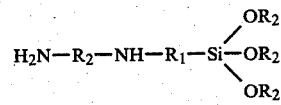

wherein $R_1$ is an alkylene having 1–6 carbon atoms and $R_2$ is an alkyl, having 1–6 carbon atoms, and aminoalkyl-trialkoxysilanes of the formula

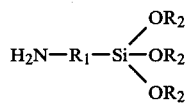

wherein $R_1$ and $R_2$ are as defined above.

Examples of preferred silanes are gamma aminopropyl triethoxy silane and normal beta aminopropyl gamma aminopropyl trimethoxy silane. The preferred concentration of the amino-silane catalyst is about 2.5 parts by weight. The amino-silane is commercially available from Union Carbide in their A-1110 and A-1120 formulations.

As expressed above, the binding means 35 or 45 and interlayer 60 or 80 have traditionally employed conventional silicones, urethanes, and epoxies. However, use of the mercaptan interlayer for these purposes provides unexpected improvement to resistance to moisture permeation. The following table compares the test samples having various composite constructions, including a construction having outer ply 30, heat-resistant interlayer 20, binding means 45 and inner ply 40, such as that seen in FIG. 11, and a construction having no binding means 35 or 45.

TABLE 4

| Composite Number | Composite Component | Thickness (in.) |
|---|---|---|
| 1 | polycarbonate (30) | 0.256 |
|   | silicone resin (35) | 0.1 |
|   | heat-resistant interlayer (20) | 0.236 |
|   | silicone resin (45) | 0.1 |
|   | polycarbonate (40) | 0.256 |
| 2 | polycarbonate heat-resistant | 0.256 |
|   | mercaptan interlayer (35) | 0.1 |
|   | heat resistant interlayer (20) | 0.236 |
|   | mercaptan interlayer (45) | 0.1 |
|   | polycarbonate (40) | 0.256 |
| 3 | as-cast acrylic (30) | 0.125 |
|   | heat-resistant interlayer (20) | 0.236 |
|   | as-cast acrylic (40) | 0.125 |
| 4 | as-cast acrylic (30) | 0.125 |
|   | heat-resistant interlayer (20) | 0.236 |
|   | silicone resin (45) | 0.1 |
|   | polycarbonate (40) | 0.256 |
| 5 | as-cast acrylic (30) | 0.125 |
|   | heat-resistant interlayer (20) | 0.236 |
|   | mercaptan layer (45) | 0.1 |
|   | polycarbonate (40) | 0.256 |
| 6 | stretched acrylic (30) | 0.1 |
|   | heat-resistant interlayer (20) | 0.125 |
|   | stretched acrylic (40) | 0.1 |
| 7 | urethane (30) | 0.1 |
|   | heat-resistant interlayer (20) | 0.236 |
|   | urethane (40) | 0.1 |
| 8 | urethane (30) | 0.1 |
|   | silicone resin (35) | 0.1 |
|   | heat-resistant interlayer (20) | 0.236 |
|   | silicone resin (45) | 0.1 |
|   | urethane (40) | 0.1 |
| 9 | urethane (30) | 0.1 |
|   | mercaptan interlayer (35) | 0.1 |
|   | heat-resistant interlayer (20) | 0.236 |
|   | mercaptan interlayer (45) | 0.1 |
|   | urethane (40) | 0.1 |
| 10 | as-cast acrylic (30) | 0.08 |
|    | heat-resistant interlayer (20) | 0.236 |
|    | as-cast acrylic (40) | 0.08 |
| 11 | as-cast acrylic (30) | 0.1 |
|    | silicone resin (35) | 0.1 |
|    | heat-resistant interlayer (20) | 0.236 |
|    | silicone resin (45) | 0.1 |
|    | as-cast acrylic (40) | 0.1 |
| 12 | as-cast acrylic (30) | 0.08 |
|    | mercaptan interlayer (35) | 0.1 |
|    | heat-resistance interlayer (20) | 0.236 |
|    | mercaptan interlayer (45) | 0.1 |
|    | as-cast acrylic (40) | 0.08 |

The composites of Table 4 were tested under extreme temperature and humidity conditions. The direct comparison of the performance of the mercaptan resin of the present invention and the preformance of the conventional silicone resin, or no binding means at all, may be seen in the graphs of FIGS. 6-9.

Figure 6:
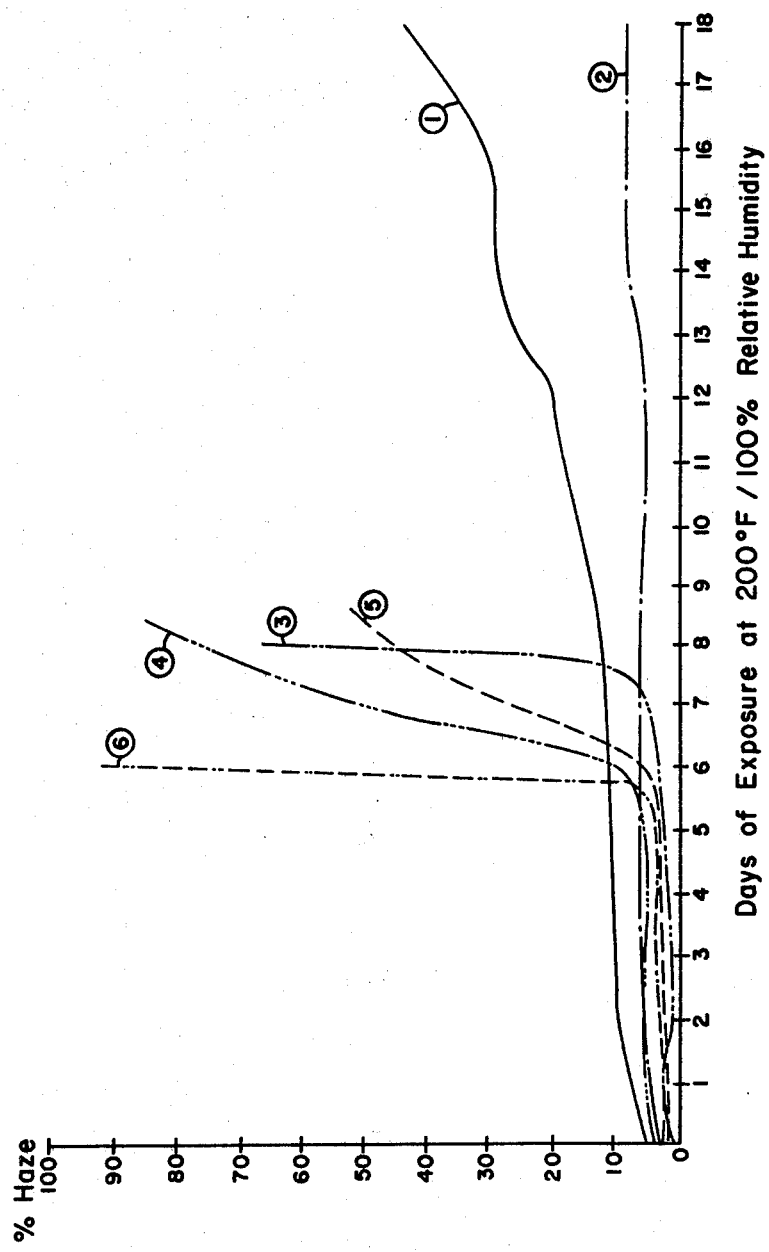
FIG. 6 is a graph showing the increased resistance to moisture permeability of mercaptan resin binding means bonded to various transparency layers when exposed to temperatures of about 200° F. and 100 percent relative humidity.

In FIG. 6, the percent of haze occurring in the composite is compared with days of constant exposure of the composite at 200° F. and 100 percent relative humidity. All other parameters constant, a direct comparison of composite No. 2 with the mercaptan interlayer of the present invention demonstrates the increased resistance to moisture permeation in the latter composite. Likewise, a direct comparison of composites No. 4 and No. 5 show the increased resistance to moisture permeation in the latter composite. Composites No. 2 and No. 5 are clearly superior to their counterparts No. 1 and No. 4, as well as No. 3 and No. 6 which do not provide any binding means moisture permeation protection.

Figure 7:
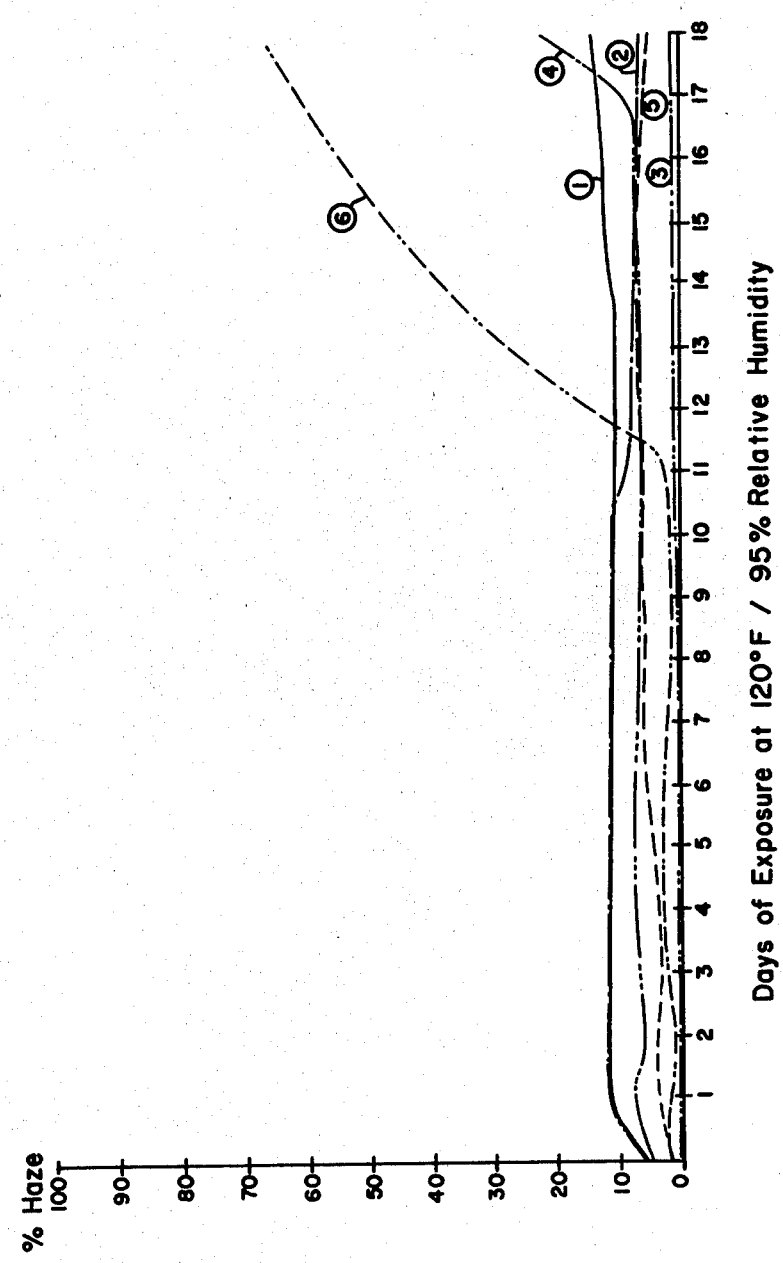
FIG. 7 is a graph showing the increased resistance to moisture permeability of mercaptan resin binding means bonded to various transparency layers when exposed to temperatures of about 120° F. and 95 percent relative humidity.

In FIG. 7, a graph showing the effect of constant exposure to 120° F. and 95 percent relative humidity to the same six composites is seen. While not as pronounced as that seen in FIG. 6, the comparison of composites No. 1 and No. 2 and of composites No. 4 and No. 5 clearly indicates the superiority of the mercaptan interlayer binding means over the silicone resin binding means.

Figure 8:
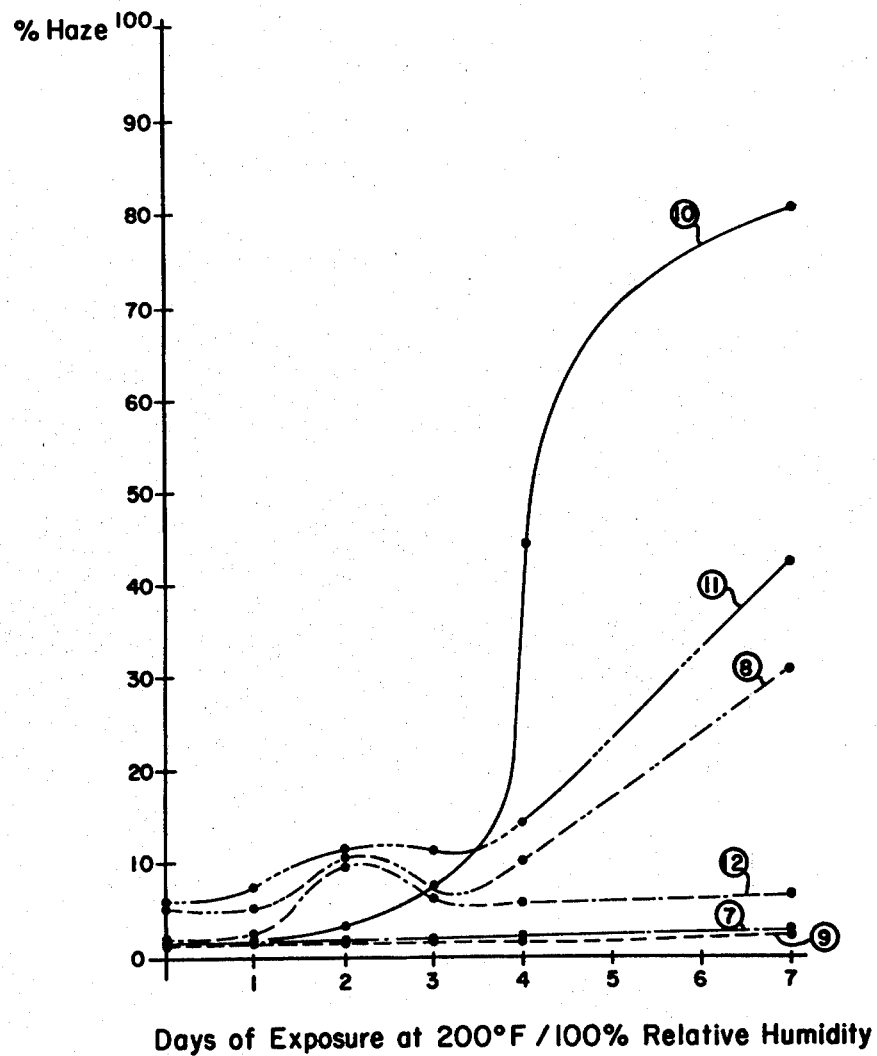
FIG. 8 is a graph showing the increased resistance to moisture permeability of mercaptan resin binding means bonded to other various transparency layers when exposed to temperatures of about 200° F. and 100 percent relative humidity.

In FIG. 8, the graph showing the test of exposure at 200° F. and 100 percent relative humidity for the remaining six composites is seen. A direct comparison of composites No. 8 and No. 9, where the only difference is the substitution of mercaptan interlayer for silicone resin, demonstrates the clear superiority of the mercaptan resin in resistance to haze as caused by moisture permeation. Further, a comparison of composites No. 11 and No. 12, substituting mercaptan interlayer for silicone resin, demonstrates the superiority of the mercaptan interlayer of the present invention over conventional binding means.

Figure 9:
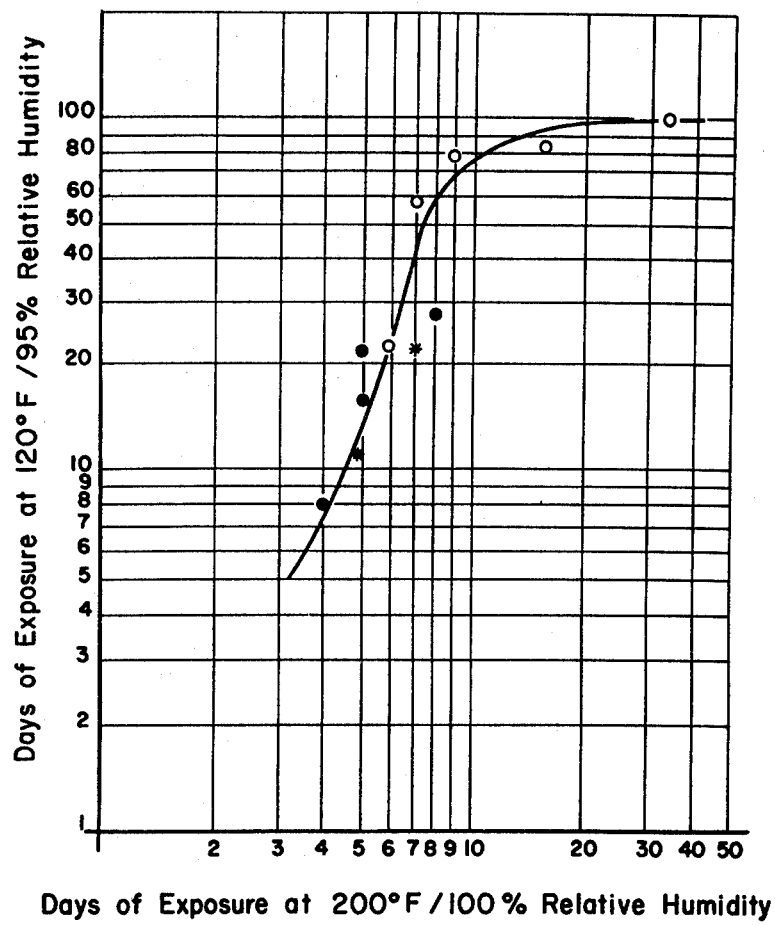
FIG. 9 is a graph showing the composite evaluation of various interlayer binding means and the effectiveness of resistance to moisture permeability.

FIG. 9 summarizes the superiority of the mercaptan interlayer of the present invention over conventional or no resin by comparing performance at 200° F./100% relative humidity with performance at 120° F./95% relative humidity. At identical acceptable percentage haze levels, the mercaptan interlayer could last as long as 100 days at 120° F./95% relative humidity and 35 days at 200° F./100% relative humidity. By comparison, the slicone resin could only withstand about 22 days at 120° F./95% relative humidity and 8 days at 200° F./100% relative humidity.

FIGS. 6-8 also demonstrate that the mercaptan interlayer of the present invention is effective for conventional outer and inner plies 30 and 40: acrylic, polycarbonate, urethane, and any combinations of them. Moreover, the mercaptan interlayer is available to replace the conventional silicone, epoxy, or urethane resins for any transparency composite using any conventional transparency including silicates commonly known as glass. Indeed, the mercaptan interlayer of the present invention is an effective interlayer 60 and 80 for clad composite transparency 50 as seen in FIG. 2.

Table 5 below demonstrates a comparison of the specific permeability values for various formulations of the mercaptan interlayer and the conventional silicone and other resins. The specific permeability of a film to moisture is defined as the milligrams of water that permeate one square centimeter of film of 1 millimeter thickness each 24 hours after a constant rate has been attained under the preferred conditions of 25° C. and using 100% relative humidity inside the cup and a phosphorus pentoxide desiccated atmosphere outside the cup. The formula of calculation is $SP=W[T(25.4 \text{ mm/in})]/A$ where SP is specific permeability, W is weight loss in milligrams in a 24 hour period, T is the film thickness in inches, and A is exposed cup surface area.

TABLE 5

| Type of Resin | Film Thickness | Specific Permeability[4] (ASTM D-1632-62) |
|---|---|---|
| mercaptan interlayer[1] | 0.098 | 0.4978 |
| mercaptan interlayer[2] | 0.124 | 0.0627 |
| mercaptan interlayer[3] | 0.114 | 0.4633 |
| low-strength silicone | 0.100 | 4.8539 |
| low-strength RTV silicone | 0.104 | 4.2270 |
| high-strength silicone | 0.100 | 4.8768 |
| high-strength RTV silicone | 0.118 | 5.4549 |
| pigmented RTV silicone | 0.101 | 4.0020 |

[1]Mercaptan interlayer comprising 100 parts by weight of mercaptan resin, 100 parts by weight of epoxy resin, and 2 parts by weight of silane catalyst.
[2]Mercaptan interlayer comprising 100 parts by weight of mercaptan resin, 50 parts by weight of epoxy resin, and 1.5 parts by weight of amino-silane catalyst.
[3]Mercaptan interlayer comprising 100 parts by weight of mercaptan resin, 100 parts by weight of epoxy resin, and 1 part by weight of amino-silane catalyst.
[4]Units in mg. mm/24 hr. cm².

Because the ideal specific permeability is near zero, it is readily seen that a mercaptan interlayer of the present invention is approximately 10 times better than conventional resins. This direct comparison demonstrates the vast superiority of a mercaptan interlayer of the present invention over those binding agents presently employed.

Two other properties significant for the interlayer of the present invention are ultimate strength and modulus. During high temperature, high humidity condition, the interlayer must maintain proper adhesion to prevent delamination of the interlayer and the other various layers in the composite. Further, the interlayer must have an acceptable rate of change of modulus during the high temperature, high humidity conditions, to prevent alteration of the interlayer effectiveness sandwiched between other layers during the course of use.

For a comparison of modulus and ultimate strength properties of the interlayers of the present invention with interlayers common to those skilled in the art, reference is had to Tables 6 and 7. Table 6 describes the formulation of the testing material and Table 7 demonstrates the effect of high temperature and high humidity on the modulus and ultimate strength properties of the formulations.

TABLE 6

FORMULATION OF INTERLAYER FOR COMPOSITE OF GLASS - INTERLAYER - POLYCARBONATE

| Formulation | Mercaptan Resin | Epoxy Resin | Amino-Silane | High Strength Silicone | Fumed Silica Compound[1] |
|---|---|---|---|---|---|
| 1 | 100 | 100 | 2 | — | — |
| 2 | 100 | 150 | 2 | — | — |
| 3 | 100 | 175 | 2 | — | — |
| 4 | 100 | 200 | 3 | — | — |
| 5 | — | — | — | 100 | 5 |
| 6 | — | — | — | 100 | — |

*[1] A thixotropic agent available commercially as CAB-O-SIL EH-5.

TABLE 7

| | | Torsional - Shear Modulus/Ultimate Strength (PSI) Formulation | | | | | |
|---|---|---|---|---|---|---|---|
| | | 1 | 2 | 3 | 4 | 5 | 6 |
| Days of Exposure at 120° F./95% Relative Humidity | 1 | 210/771 | 78/148 | 25/62 | 28/60 | 25/43* | 16/53 |
| | 2 | 207/450 | — | 22 | 22 | 6/8** | — |
| | 3 | — | — | — | — | — | 22/72 |
| | 4 | — | — | — | — | — | 7/19** |
| | 6 | 190/291 | 49/110 | — | 33/67 | 6/10 | — |
| | 7 | — | — | 33/65 | — | — | — |
| | 14 | 166/266 | 73/122 | — | 98/153 | 9/14 | — |
| | 15 | — | — | 55/101 | — | — | — |
| | 27 | 85/200 | — | — | 105/289 | — | — |

*Haze Appeared
**Delamination Started

As may be seen from an examination of Table 7, a variation in the formulation of the inner layer of the present invention may control the modulus and its rate of change during the days of exposure to high-temperature/high-humidity conditions. Over the course of the period examined, the ultimate strength and its rate of change could be controlled by the type of formulation of the interlayer. Generally, with increasing epoxy resin concentration, the modulus and ultimate strength comparisons during the days of the exposure increased when the epoxy was greater than 150 parts per 100 parts of mercaptan resin.

Table 7 also demonstrates the clear superiority of the interlayer formulations of the present invention over those interlayer compositions known to those skilled in the art. On the first day, formulation No. 5 exhibited haze, and by the fourth day, both silicone formulations started to delaminate from the composite of glass-interlayer-polycarbonate. In comparison to this, the formulations 1 and 4 lasted as long as 27 days when the experiment was concluded to report these results. Furthermore, the interlayer formulations of the present invention have a variety of modulus and ultimate strength properties to meet various commercial applications depending upon the materials between which the interlayer is sandwiched.

Figure 14:
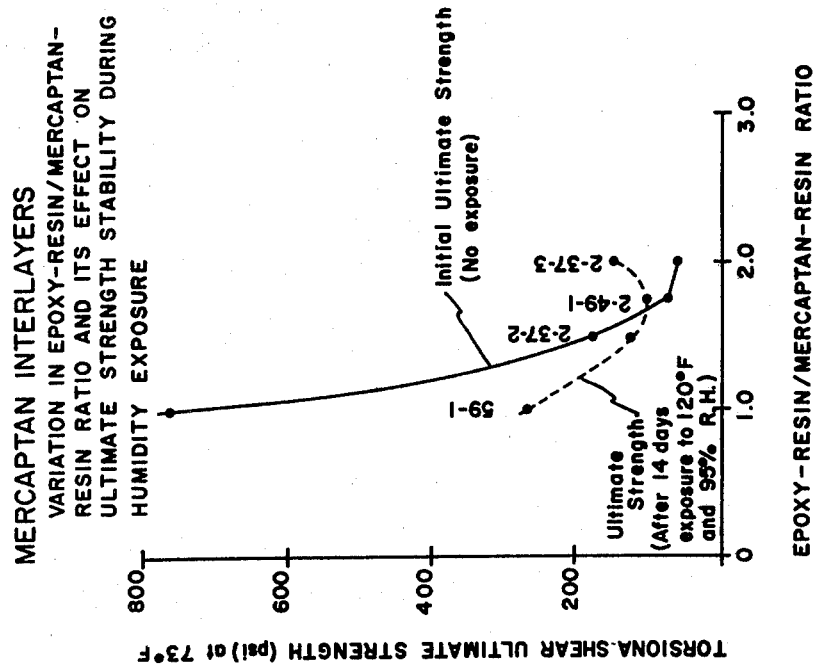
FIG. 14 is a graph showing the variation in concentrations of the composition of the present invention and its effect on ultimate strength stability during humidity exposure.
Figure 13:
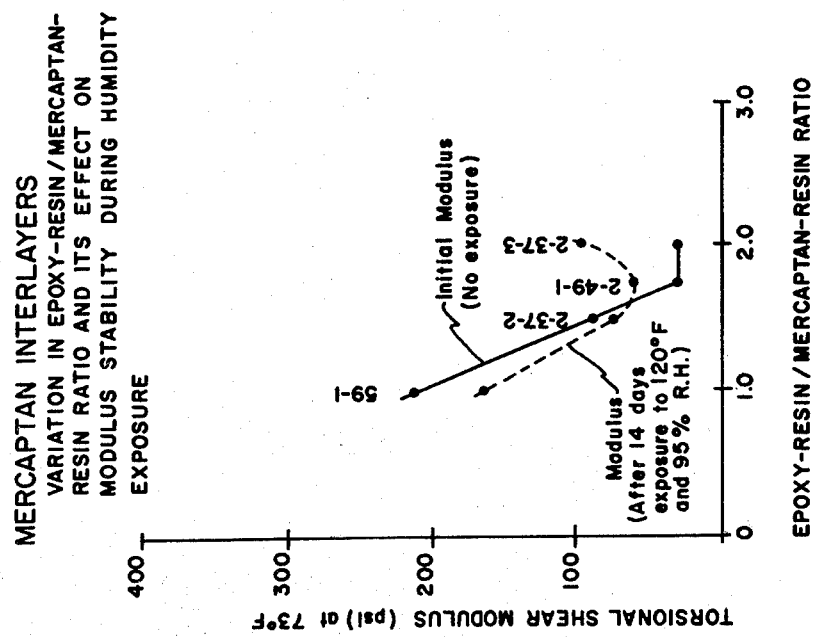
FIG. 13 is a graph showing the variation in concentrations of the concentrations of the composition of the present invention and its effect on modulus stability during humidity exposure.

From an examination of FIGS. 13 and 14, it is possible to optimize the formulation for modulus stability and ultimate strength stability. FIG. 13 demonstrates in graphic form the information shown in Table 6 for a comparison of initial modulus with the modulus after 14 days of exposure. A ratio of epoxy resin/mercaptan resin exhibits stability over the 14 days in the range of 1.5 to 1.8. Likewise, this ratio is confirmed for ultimate strength comparisons as seen in FIG. 14.

Figure 10:
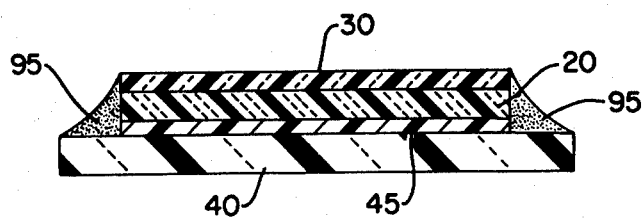
FIG. 10 is a cross-sectional view of a transparency composite at an edge as sealed by edge sealant material of the present invention.

The mercaptan composition of the present invention is effective, not only to resist moisture permeation between plies of transparent composite construction. As seen in FIG. 10, edge sealant 95 may seal edges of outer ply 30, heat-resistant interlayer 20, binding means 45 (either of the invented composition or a conventional composition) and the upper surface of inner layer 40. The composite shown in FIG. 10 is the same as the composite 90 shown in FIG. 11, typical of transparent composites used in high elevation aircraft. Edge sealer 95 is likewise useful to seal edges of composites as shown in FIG. 1 and 2 or any conventional transparent composite, either with inner ply 40 extending beyond the other transparency components or cut at the same place as the other transparency components.

Figures 11, 12:
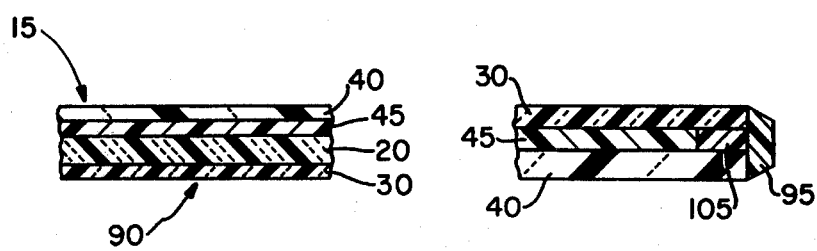
FIG. 11 is a cross-sectional view of a transparency composite having no innerlayer binding means between the intense heat-resistant interlayer and the outside ply.
FIG. 12 is an illustrative view of a transparency composite having a slot to be filled and an edge-sealant material.

The mercaptan composition may also fill in the slot created during the manufacture of the transparency on the outside edge of any transparency composite. As seen in FIG. 12, this slot filler 105 combines the functions of the edge sealant 95 and the interlayer 45. Neither the slot filler 105 nor the edge sealant need be transparent and may be translucent or opaque with the addition of thixotropic agents, such as fumed silica compounds, or fillers. Indeed, slot filler 105 and edge sealer 95 may merge into a perimeter sealant.

The edge sealer 95 and the slot filler 105 demonstrates significant improvements over the use of high-strength silicones known to those skilled in the art. An examination of Table 8 demonstrates the moisture impermeability of the mercaptan compositions over that of the high-strength silicone.

addition of an edge sealer having one mercaptan composition plus the thixatropic agent increase the performance of the composite during the 29 days of exposure. After the edge sealer 95 was cut off, the slot filler 105 could only be removed with manual difficulty. However, the silicone interlayer could be delaminated from both the glass and polycarbonate, although the adhesion was better than that found in Panel 1. By increasing the epoxy resin concentration, Panel 3 demonstrated some improvement over that seen for Panel 2. In this case, after the edge sealer and slot filler were cut off and removed with manual difficulty, the silicone interlayer could be delaminated from only the glass layer. While Panels 2 and 3 represent improvement over the conventional performance of Panel 1, Panels 4 and 5 provide even greater improvement.

By using the mercaptan compositions for both slot filler 105 and edge sealer 95, the interlayer was significantly protected from moisture permeation. For the interlayers of Panels 4 and 5, the combination of the edge sealer and slot filler provided the protection to maintain a bond between the silicone interlayer and both the glass and polycarbonate. Indeed, using this second mercaptan composition, slot filler 105 had to be dug from the periphery of the Panel No. 5.

The mercaptan compositions of the present invention not only serve as an interlayer, but also may serve as an edge sealer or slot filler. The variety of combinations of transparent composites which may employ the composition of the present invention in these various functions is within the scope of this invention.

According to the process of the present invention with regard to making a haze-free, high transparent, high heat-resistant laminate, an initial laminate is first made, generally indicated by the numeral 200. The purpose of this laminate as shown in FIG. 17, is to cast

TABLE 8

EXAMINATION OF GLASS-SILICONE-POLYCARBONATE COMPOSITES WITH EDGE SEALERS AND SLOT FILLERS EXPOSED 29 DAYS AT 120° F./95% R.H.

| PANEL NO. 1 | PANEL NO. 2 | PANEL NO. 3 | PANEL NO. 4 | PANEL NO. 5 |
|---|---|---|---|---|
| SLOT-FILLER (105) | HIGH-STRENGTH SILICONE PLUS 5% BY WT. CAB-O-SIL EH-5 (Fumed Silica Compound) | | MERCAPTAN* COMPOSITION PLUS 5% BY WT. CAB-O-SIL EH-5 (Fumed Silica Compound) | MERCAPTAN** COMPOSITION PLUS 5% BY WT. CAB-O-SIL EH-5 (Fumed Silica Compound) |
| EDGE SEALER (95) | NONE | MERCAPTAN COMPOSITION* PLUS 5% BY WT. CAB-O-SIL EH-5 (Fumed Silica Compound) | MERCAPTAN COMPOSITION** PLUS 5% BY WT. CAB-O-SIL EH-5 (Fumed Silica Compound) | MERCAPTAN COMPOSITION* PLUS 5% BY WT. CAB-O-SIL EH-5 (Fumed Silica Compound) | MERCAPTAN COMPOSITION** PLUS 5% BY WT. CAB-O-SIL EH-5 (Fumed Silica Compound) |
| INTERLAYER (HIGH-STRENGTH SILICONE) (45) | Slot-Filler can be removed. Silicone interlayer can be readily delaminated from glass and polycarbonate | Edge sealer cut off Slot-Filler could be removed with manual difficulty Silicone interlayer could be delaminated from both, The adhesion was much better than Panel No. 1 | Edge sealer cut off Slot-Filler could be removed with difficulty Silicone interlayer could be delaminated from glass only-was better than Panel No. 1 | Edge sealer cut off Slot-Filler could be removed with difficulty Silicone interlayer appeared to be well bonded | Edge sealer cut off Slot-Filler had to be dug out Silicone interlayer appeared to be well bonded - minor spot delaminations |

*Mercaptan Resin 100  Epoxy Resin 100  Amino-Silane 2
**Mercaptan Resin 100  Epoxy Resin 200  Amino-Silane 2

Each panel was subjected to 29 days of exposure at 120° F. and 95% relative humidity. Panel No. 1 only had a high-strength silicone slot filler and once that was removed, it was apparent that the silicone interlayer could be readily delaminated from both the glass and the polycarbonate layers. In contrast to this the mere a high heat-resistant material therein as described hereinabove. That is, the high heat-resistant material generally contains a boroxine compound in an epoxy resin, as well as optionally various phosphites, phenyl substituted alcohols, and the like. The laminate is assembled by providing spacer blocks 202. On either side of spacer blocks 202 is a protective non-glass layer, one of which is an as-cast acrylic layer or sheet 210. To each protectant layer 210 is added an ordinary or conventional glass sheet 220. The purpose of the glass sheet is to prevent the acrylic from flexing or bowing outwardly or inwardly, since glass is a relatively stiff and inflexible material. Thus, generally any non-flexible material may be utilized in lieu of glass such as aluminum plates, and the like. Once the laminate has been formed, the high heat-resistant material is cast into place and allowed to cure. An initial laminate is formed, as shown in FIG. 17. Upon cure, the outer layers of glass, etc., are removed providing a preform laminate having a layer of high heat-resistant material therein which is not exposed to the air and hence moisture buildup on the heat-resistant surfaces is prevented. The preform, generally indicated by the numeral 230, thus has at least one as-cast acrylic layer. Spacers 202 may remain intact or be removed from subsequent use of the preform laminate.

As noted above, the high heat-resistant material which may be utilized with regard to various high heat sources such as fossil fuel fires, nuclear explosion, high energy lasers, or other high temperature heat sources, is generally made of a mixture of compounds such as epoxy resins, various boroxine compounds, various phosphorus compounds, and the like. The ranges, desired amounts, preferred compounds, preparation, and all aspects thereof are all set forth hereinabove and is hereby fully incorporated. Once the high heat-resistant compound 205 has been cast, injection molded, or otherwise added to the space between protectant layers 220, it is cured. Curing temperature can range from room or ambient temperature; that is, from about 60° to 70° F. to approximately 250° F. A desirable temperature range is from about 150° F. to about 200° F., with approximately 190° F. being preferred. Actually, the upper limit of the curing temperature is the softening point of the as-cast acrylic. Thus, depending upon the type of acrylic, the curing temperature can even exceed 250° F. Naturally, time of cure will generally vary inversely proportional to the curing temperature. Thus, room temperature cure will roughly range from about 18 to 24 hours, whereas a cure at approximately 190° F. will roughly average approximately 3 hours.

The epoxy utilized in the high heat-resistant layer can generally be any type of epoxy or novolac type epoxy resin. The only requirement is that, regardless of type of epoxy resin utilized, the amount of novolacs therein be approximately a minimum of 10 percent by weight, that is from 10 percent to about 100 percent, and preferably from about 25 percent to about 100 percent by weight.

It has been found that the high heat-resistant material gives relatively good release when separated from the as-cast acrylic plastic layer. Accordingly, no release compounds are required as are required when glass is utilized. The elimination of the various release compounds, for example, Repcon, or dimethyldichlorosilane, largely eliminates any haze buildup during the formation of the initial high heat-resistant laminate or during subsequent process steps.

With respect to protectant layer 210 being an acrylic layer, it generally can be any conventional acrylic "as-cast" layer. "As-cast" is a term of the art which generally refers to the production of an acrylic sheet via a casting process. It does not relate to or include a stretched acrylic layer. Examples of conventional acrylic layers include Plex II UVA, an acrylic manufactured by Rohm and Haas, and the like.

In lieu of one of the as-cast acrylic layers, a non-glass transparent material may be utilized. Specific examples include polycarbonate, polyurethane, and the like.

Once preformed high heat-resistant laminate 230 is desired to be utilized, one as-cast acrylic layer thereof or the sole as-cast acrylic layer thereof is peeled off in a continuous process, that is without stopping, so as not to leave a visual distortion line within high heat-resistant layer 205. The peeling can occur from room temperature up to below the softening point of the acrylic, for example about 250° F. The remaining preform of the high heat-resistant layer and the as-cast acrylic layer or the transparent material attached thereto has very low stress incorporated into the layers.

Preferably, immediately upon the removal of the sole or one of the as-cast acrylic layers as shown in FIG. 19, the remaining laminate structure is formed into a semi-final laminate or structure wherein the exposed surface of the high heat-resistant layer is covered, or into a final high heat-resistant laminate, a specific example of which is generally indicated by the numeral 240 in FIG. 20. The final laminate is prepared by inserting spacer plugs, not shown, in association with regard to the high heat-resistant layer 205, and inserting at least another transparent layer 218 thereover to form a cavity. The cavity is then filled with a flexible adhesive or interlayer to adhere the transparent layer to the high heat-resistant material. The laminate is then cured.

Layers 205 and 210 of the final laminate have been previously described. The clear adhesive material layer 214 can be any conventional transparent material which acts as a barrier between dissimilar materials with regard to coefficient of thermal expansion so that high clarity is maintained. The flexible adhesive layer 214 thus adheres transparent layer 218, which can be a backing layer, to the preformed laminate. The result is a highly transparent laminate having very little haze therein. Thus, it is seen that according to the present invention, a process is presented whereby a preformed laminate 230 containing a high heat-resistant layer with the high heat-resistant layer being protected against haze formation until it is finally incorporated into a final laminate. The final laminate in having additional layers incorporated therein of generally any conventional transparent material in any combination results in numerous different combinations, one of which is shown in FIG. 20. Examples of various transparent materials include glass, acrylic, polyurethane, polycarbonate, transparent adhesives, and the like. Of course, any desired number of interlayers and transparent material layers can be utilized in any combination, in addition to the preform layers so that numerous multi-layered laminations exist.

Layer 218 which often can be a backing layer can generally be any conventional strong transparent material. Specific examples include any conventional polycarbonate, as-cast acrylic, any conventional transparent polyurethane, and to a lesser desired extent, glass. Naturally, the thicknesses of any of the layers described in this process can vary and, depending upon desired use, end results, and the like.

As noted, the transparent adhesive layer resides on the high heat-resistant layer, according to the present invention, whenever it bonds materials of dissimilar coefficient of thermal expansion to reduce stress and improve adhesion or moisture resistance. Naturally, more than one transparent adhesive layer can be utilized in the laminate. Interlayer 214 can be any flexible adhesive as set forth above such as conventional silicone or polyurethane adhesive, or a mercaptan layer. The mercaptan adhesive will usually have an epoxy resin and a silane catalyst as set forth above. The polyurethane and the mercaptan are preferred since they do not require a primer coating.

Although any flexible transparent adhesive can be utilized which can be cured from about room temperature up to about 250° F., or below the softening point of the acrylic layer, it is highly desirable that the acrylic not be distorted. Therefore, the use of a transparent adhesive having a low cure temperature as possible is desired. The low temperature also reduces any stress buildup in the laminate upon cure thereof. Accordingly, the use of materials having cure temperatures of less than 130° F. are preferred. Examples of specific clear adhesive interlayers 250 are set forth in the specification.

Other highly transparent, low haze, heat-resistant laminates can be formed utilizing the process of the present invention, with the following flow diagram and specific examples representing only a portion of the numerous various possible combinations.

utilized. In order to prevent any haze buildup during the primary application, short cure times are desired.

The various layers can be cast flat as shown in the Figures or they can be cast in a curved shape to produce the final item, for example a canopy for a jet fighter. The present invention is particularly suitable with regard to forming curved laminates since protective layers 210 can be readily formed whereas if a glass layer is used, it would require special molds and high temperatures. Moreover, it is noted that in certain instances, a laminate is not required. Therefore, both protective sheets 210 as shown in FIG. 18 can be peeled off, and the item utilized as for a window, as for example in a commercial jet aircraft. Since the window will be flat, it is highly rigid and requires bending or stretching as does curved shapes. The monolithic sheet may be cured in the protective layers. Alternately, it may be removed from the protective layers and cured at temperatures above the 250° F., above the approximate softening temperature of the as-cast acrylic.

Thus, according to the present process, a method is presented whereby various high heat-resistant laminates can be formed whenever a flexible transparent adhesive layer or inner liner layer is required to be positioned and attached to the high heat-resistant layer and low haze is

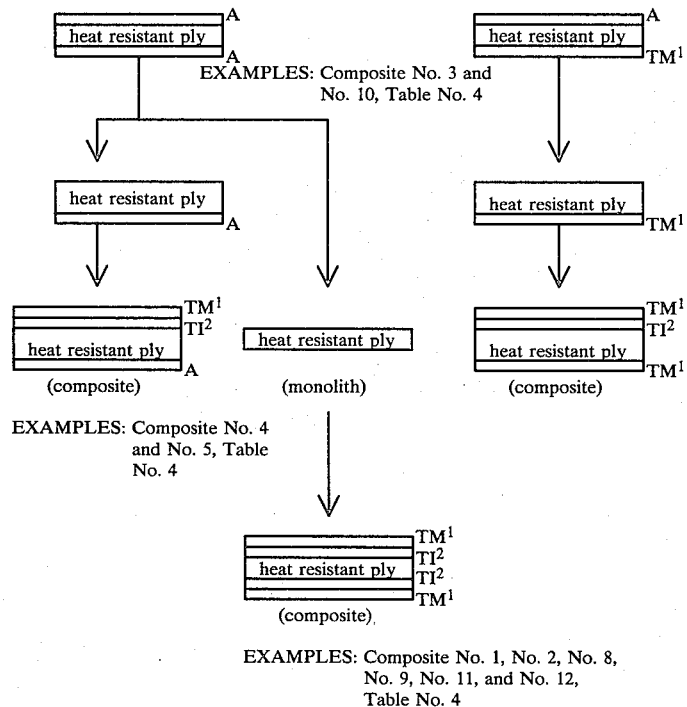

TM[1]—Transparent Materials: acrylic, polycarbonate, urethane, or combinations thereof.
TI[2]—Transparent Interlayers: silicones, urethanes, and mercaptans.

Should a primer be required, although the use of a primer is generally avoided, any conventional primer such as a silicone primer can be utilized. The primer is cured at a temperature of from about room temperature to about 250° F. Desirably, a clear silicone priming agent is utilized to obtain adhesion between a heat-resistant layer and the interlayer 214, or between the interlayer and the transparent material, and the like. Naturally, the time of cure will generally vary with the temperature. In addition to a silicone primer, various specific types of urethanes which prevent moisture penetration and to not result in haze buildup may be desired. In use, upon the application of intense heat, the high heat-resistant layer which contains boroxane as well as other compounds set forth herein will generally char and prevent the heat from being transferred to the remaining layers. The result is that the integrity of the laminate is maintained and that it is not totally burned away.

The improvement of the present invention is shown in the following examples which show lower haze values for various laminates made according to the present process as compared to a different process.

EXAMPLE

A laminate was made according to FIG. 17 wherein as-cast acrylic layers were positioned on either side of spacer blocks, and a glass plate was positioned on either side thereof. To this construction was added a heat-resistant material having the formulation set forth in Table 3, Formulation C. The laminate was heated at 190° F. and allowed to cure for three hours. The glass sheets were removed from the laminate to yield a preform which was hung overnight. The next day one of the as-cast acrylic plies was removed at room temperature. The exposed high heat-resistant surface was mirror-like in appearance. Said surface was wiped with methanol to remove any dust therefrom. A silicone primer manufactured by General Electric, Type SS-4120, was flow-coated over the surface and cured at 190° F. for one hour. Then, a sheet of likewise primed polycarbonate was placed over the prime surface in space relation therefrom and a conventional silicone material added to the space to form an interlayer. The laminate which is similar in layers to FIG. 20, was cured for 1¾ hours at 190° F. The resultant laminate measured 4.1 on a haze meter, but visually was very clear in appearance throughout.

Utilizing the same process, a chlorosilaned glass which had been coated with Repcon was made. This exact same identical laminate, with the exception of having a glass layer on the heat-resistant material when initially formed, had an average haze meter reading of from 5 to 6 percent. From a visual standpoint, this laminate had a ghost pattern thereon, that is appeared occluded and was visually varied difference in clarity from the above-noted laminate made utilizing the present invention.

Thus, as apparent from the Example, applicant's process results in a very marketedly improved clarity concerning the formation of high heat-resistant laminates.

While in accordance with the patent statutes, a best mode and preferred embodiments of the invention have been provided, the invention is not to be limited thereto or thereby. Therefore, for an understanding of the scope of the invention, reference is had to the following claims.

What is claimed is:

1. A process for preparing a transparent, low haze, high heat-resistant laminate, comprising the steps of:
   forming a high heat-resistant layer between transparent protective layers so that a transparent protective layer is located on either side of said heat-resistant layer, at least one of said protective layers being an as-cast acrylic layer, and curing said heat-resistant layer at a temperature of from about 60° F. to about 250° F.,
   wherein said high heat-resistant layer has from about 80 parts to about 100 parts by weight of an epoxy resin, said epoxy resin containing at least 25 percent by weight of novolac therein, and
   from about 5 to about 30 parts by weight of a boroxine compound having the formula

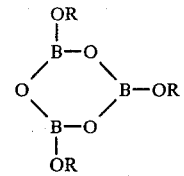

wherein R is a group having from 1 to 18 carbon atoms, and from about 1 part to about 10 parts by weight of a phenyl substituted alkyl alcohol, said alkyl alcohol having from 1 to 10 carbon atoms.

2. A process according to claim 1, wherein when only one of said layers is an as-cast acrylic layer said protective layer other than said as-cast acrylic layer is a material selected from the group consisting of an as-cast acrylic, a polyurethane, a polycarbonate, and combinations thereof.

3. A process according to claim 2, including the step of removing at least one of said acrylic layers.

4. A process according to claim 3, including applying a primer to said high heat-resistant layer, and curing said primer layer from an ambient temperature to about 250° F.

5. A process according to claim 3, including applying a transparent layer to said high heat-resistant layer.

6. A process according to claim 3, including adding a flexible adhesive interlayer to said high heat-resistant layer.

7. A process according to claim 6, including adding a transparent layer to said flexible adhesive layer, and curing said adhesive layer at a temperature of from about ambient to about 250° F.

8. A process according to claim 7, wherein said transparent material is selected from the group consisting of polycarbonate, polyurethane, glass, as-cast acrylic, and combinations thereof wherein said flexible adhesive layer is a silicone adhesive, a polyurethane adhesive, or a mercaptan adhesive, and curing said heat resistant layer at a temperature of from about 150° F. to about 200° F.

9. A process according to claim 3, including locating a transparent material in spaced relationship to said high heat-resistant layer, and subsequently adding a flexible adhesive to said space between said heat-resistant layer and said transparent layer.

10. A process according to claim 9, wherein said transparent material is selected from the group consisting of polycarbonate, polyurethane, glass, as-cast acrylic, and combinations thereof.

11. A process according to claim 10, wherein said flexible adhesive is selected from the group consisting of a silicone adhesive, a polyurethane adhesive, a mercaptan adhesive, and combinations thereof.

12. A process according to claim 11, including curing said flexible adhesive at a temperature ranging from about ambient temperature to about 250° F. and curing said heat-resistant layer at a temperature of from about 150° F. to about 200° F.

13. A process according to claim 3, including removing both of said protective layers.

14. A process according to claim 3, including adding a plurality of flexible adhesive layers and a plurality of transparent layers to said heat-resistant layer, one of said adhesive layers located on said heat-resistant layer.

15. A process according to claim 13, including adding a plurality of flexible adhesive layers and a plurality of transparent layers to said heat-resistant layer, one of said adhesive layers located on said heat-resistant layer, and curing said adhesive layer at a temperature of from ambient to about 250° F.

16. A process according to claim 1, 2, 7, 8, 9, 12, or 15 wherein said high heat-resistant layer contains from about 1 to about 40 parts by weight per 100 parts of said epoxy compound of an organic phosphorus compound having the formula

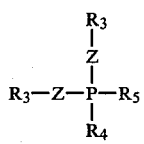

where R₃ is selected from the group consisting of hydrocarbon radicals having from 1 to 24 carbon atoms, halo-substituted organic radicals having from 1 to 24 carbon atoms, and multihalo-substituted organic radicals having from 1 to 24 carbon atoms; and where R₃ may be the same or different radicals, where R₄ is selected from the group consisting of all the radicals of R₃, oxygen, and radicals of the formula: —O—R₆, where R₆ is selected from the group consisting of all the radicals of R₃, organophosphorus polymeric radicals, and organo-phosphorus esters; where R₅ is selected from the group consisting of hydrogen, hydroxy, oxygen, sulfur, halogens or no radical at all; and where Z is selected from the group consisting of oxygen, sulfur, or no radical at all.

17. A process according to claim 16, wherein said boroxine has an alkyl group having from 1 to 5 carbon atoms, wherein said alkyl of said alcohol has from 1 to 10 carbon atoms, and wherein said phosphorus compound is selected from the group consisting of diphenyl phosphite, triphenyl phosphite, trisnonylphenyl phosphite, diphenylisooctyl phosphite, diphenylisodecyl phosphite, and combinations thereof.

18. A process according to claim 17, wherein said boroxane compound is trimethoxyboroxine, wherein said alcohol is benzyl alcohol, and wherein said phosphorus compound is selected from the group consisting of diphenyl phosphite, triphenyl phosphite, and combinations thereof.

19. A process according to claim 5, 7, 8, 9, or 12, wherein said interlayer is an epoxy resin containing a mercaptan, said inner layer comprising about 100 parts by weight of a mercaptan compound having the formula

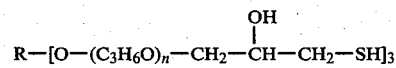

wherein R is an aliphatic hydrocarbon group having from 1 to 18 carbon atoms, and wherein n is 1 or 2, from about 40 to about 250 parts by weight of an epoxy resin having at least 10 percent by weight of novolac therein, and from about 0.5 parts by weight to about 4.0 parts by weight of a silane selected from the group consisting of: N-aminoalkyl-aminoalkyl-trialkoxysilanes of the formula:

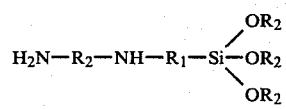

wherein R₁ is an alkylene having from 1 to 6 carbon atoms and R₂ is an alkyl having 1 to 6 carbon atoms, and aminoalkyl-trialkoxysilanes of the formula:

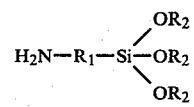

wherein R₁ and R₂ are as defined above, and combinations thereof.

20. A process according to claim 16, wherein said interlayer is an epoxy resin containing a mercaptan, said inner layer comprising about 100 parts by weight of a mercaptan compound having the formula

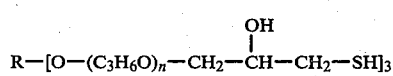

wherein R is an aliphatic hydrocarbon group having from 1 to 18 carbon atoms, and wherein n is 1 or 2, from about 40 to about 250 parts by weight of an epoxy resin having at least 10 percent by weight of novolac therein, and from about 0.5 parts by weight to about 4.0 parts by weight of a silane selected from the group consisting of: N-aminoalkyl-aminoalkyl-trialkoxysilanes of the formula:

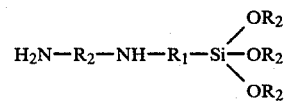

wherein R₁ is an alkylene having from 1 to 6 carbon atoms and R₂ is an alkyl having 1 to 6 carbon atoms, and aminoalkyl-trialkoxysilanes of the formula:

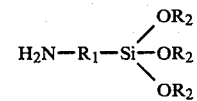

wherein R₁ and R₂ are as defined above, and combinations thereof.

21. A process according to claim 18, wherein said interlayer is an epoxy resin containing a mercaptan, said inner layer comprising about 100 parts by weight of a mercaptan compound having the formula

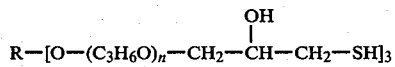

wherein R is an aliphatic hydrocarbon group having from 1 to 18 carbon atoms, and wherein n is 1 or 2, from about 40 to about 250 parts by weight of an epoxy resin having at least 10 percent by weight of novolac therein, and from about 0.5 parts by weight to about 4.0 parts by weight of a silane selected from the group consisting of:

N-aminoalkyl-aminoalkyl-trialkoxysilanes of the formula:

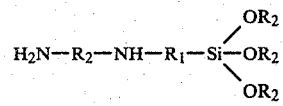

wherein $R_1$ is an alkylene having from 1 to 6 carbon atoms and $R_2$ is an alkyl having 1 to 6 carbon atoms, and aminoalkyl-trialkoxysilanes of the formula:

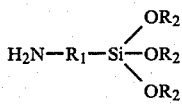

wherein $R_1$ and $R_2$ are as defined above, and combinations thereof.

22. A process for preparing a transparent, low haze, heat-resistant laminate, comprising the steps of:

locating two protective layers in juxtaposition to one another and having a space therebetween, at least one of said protective layers being an as-cast acrylic material, forming a high heat-resistant material between said spaced protective layers, and curing said heat-resistant material at a temperature of from about 60° F. to about 250° F., said high heat-resistant layer having from about 80 parts to about 100 parts by weight of an epoxy resin, said epoxy resin containing at least 25 percent by weight of novolac therein, and from about 5 to about 30 parts by weight of a boroxine compound having the formula

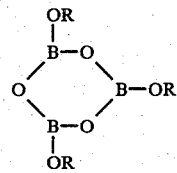

where R is a group having from 1 to 18 carbon atoms, and from about 1 to about 40 parts by weight of a phosphate compound.

23. A process according to claim 22, wherein when only one of said layers is an as-cast acrylic layer, said protective layer other than said as-cast acrylic layer is a material selected from the group consisting of an as-cast acrylic, a polyurethane, a polycarbonate, and combinations thereof.

24. A process according to claim 23, including the step of removing one of said acrylic protective layers and exposing a surface of said heat-resistant layer.

25. A process according to claim 24, including the step of priming said exposed surface of said high heat-resistant layer and curing said primers at a temperature of from about ambient to about 250° F.

26. A process according to claim 24, including the step of adding a flexible adhesive to said high heat-resistant layer, and curing said adhesive agent at a temperature of from ambient to about 250° F.

27. A process according to claim 26, including adding a transparent layer to said flexible adhesive layer.

28. A process according to claim 27, including curing said heat-resistant layer at a temperature of from about 150° F. to about 200° F.

29. A process according to claim 28, wherein said transparent material is selected from the group consisting of polycarbonate, polyurethane, glass, as-cast acrylic, and combinations thereof, and wherein said flexible adhesive layer is a silicone adhesive, a polyurethane adhesive, or a mercaptan adhesive.

30. A process according to claim 22, 24, 27, 28, or 29, wherein said phosphate is selected from the group consisting of tri(beta, beta' dichloroisopropyl) phosphate, tri(beta chloroethyl) phosphate, bis chloroethyl phosphate ester, and a phosphate polymer of the formula:

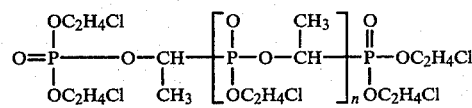

where n is a number from 1 to 20.

31. A process according to claim 30, wherein said interlayer is an epoxy resin containing a mercaptan, said inner layer comprising about 100 parts by weight of a mercaptan compound having the formula

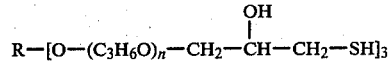

wherein R is an aliphatic hydrocarbon group having from 1 to 18 carbon atoms, and wherein n is 1 or 2, from about 40 to about 250 parts by weight of an epoxy resin having at least 10 percent by weight of novolac therein, and from about 0.5 parts by weight to about 4.0 parts by weight of a silane selected from the group consisting of: N-aminoalkyl-aminoalkyl-trialkoxysilanes of the formula:

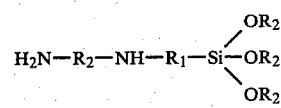

wherein $R_1$ is an alkylene having from 1 to 6 carbon atoms and $R_2$ is an alkyl having 1 to 6 carbon atoms, and aminoalkyl-trialkoxysilanes of the formula:

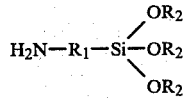

wherein $R_1$ and $R_2$ are as defined above, and combinations thereof.

32. A process according to claim 30, wherein said boroxine compound is trimethoxyboroxine, and wherein said phosphate compound is selected from the group consisting of tri(beta, beta' dichloroisopropyl) phosphate, and tri(beta chloroethyl) phosphate.

* * * * *

UNITED STATES PATENT OFFICE
CERTIFICATE OF CORRECTION

Patent No. 4,382,832            Dated May 10, 1983

Inventor(s) John Uram, Jr.

It is certified that error appears in the above-identified patent and that said Letters Patent are hereby corrected as shown below:

Column 11, Table 4, line 34, delete the word "heat-resistant" and substitute therefor --(30)--; and move the numbers "0.256" to the right hand column in that table immediately opposite "polycarbonate (30)".

Signed and Sealed this

Thirtieth Day of August 1983

[SEAL]

Attest:

Attesting Officer

GERALD J. MOSSINGHOFF

Commissioner of Patents and Trademarks